(12) United States Patent
Keusen et al.

(10) Patent No.: US 8,528,324 B2
(45) Date of Patent: Sep. 10, 2013

(54) DEVICE FOR METERING FUEL

(75) Inventors: Guenter Keusen, Remseck-Pattonville (DE); Volker Reusing, Stuttgart (DE); Stefan Stein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 331 days.

(21) Appl. No.: 13/054,320

(22) PCT Filed: May 18, 2009

(86) PCT No.: PCT/EP2009/055972
§ 371 (c)(1),
(2), (4) Date: Feb. 9, 2011

(87) PCT Pub. No.: WO2010/006829
PCT Pub. Date: Jan. 21, 2010

(65) Prior Publication Data
US 2011/0138792 A1    Jun. 16, 2011

(30) Foreign Application Priority Data
Jul. 16, 2008   (DE) .................. 10 2008 040 463

(51) Int. Cl.
*F01N 3/00* (2006.01)
*F01N 3/10* (2006.01)
(52) U.S. Cl.
USPC .............. 60/303; 60/286; 60/299; 60/300
(58) Field of Classification Search
USPC ........................ 60/286, 295, 299, 300, 303
See application file for complete search history.

(56) References Cited

U.S. PATENT DOCUMENTS

| | | |
|---|---|---|
| 2007/0068525 A1 | 3/2007 | Offenhuber et al. |
| 2008/0202102 A1 | 8/2008 | Rodriguez-Amaya et al. |
| 2009/0050109 A1 | 2/2009 | Hoffmann et al. |
| 2009/0205316 A1 | 8/2009 | Dougnier et al. |
| 2010/0319325 A1 * | 12/2010 | Reusing et al. .................. 60/286 |

FOREIGN PATENT DOCUMENTS

| | | |
|---|---|---|
| DE | 19946900 | 12/2000 |
| DE | 10324482 | 12/2004 |
| DE | 102005034704 A1 | 2/2007 |
| DE | 102005046070 | 3/2007 |
| DE | 102006032155 | 1/2008 |
| DE | 102006062491 A1 * | 7/2008 |
| EP | 1656986 | 5/2006 |
| JP | 2002242780 | 8/2002 |
| JP | 2003344713 | 8/2003 |
| WO | 2008006840 A1 | 1/2008 |
| WO | 2008080693 A1 | 7/2008 |

* cited by examiner

*Primary Examiner* — Kenneth Bomberg
*Assistant Examiner* — Audrey K Bradley
(74) *Attorney, Agent, or Firm* — Michael Best & Friedrich LLP

(57) ABSTRACT

The invention relates to a metering device for fuel upstream of an oxidation catalytic converter in the exhaust gas system of an internal combustion engine. A closing valve and/or a metering valve and an injection valve are integrated downstream of a supply device for fuel into a line leading to a metering unit. A return having a first overflow valve branches off upstream of the metering unit. A further return having a second overflow valve influencing a mean pressure level of the metering unit is disposed between the closing valve and the metering valve.

12 Claims, 2 Drawing Sheets

DEVICE FOR METERING FUEL

CROSS-REFERENCE TO RELATED APPLICATION

This application is a 35 USC 371 application of PCT/EP 2009/055972 filed on May 18, 2009.

BACKGROUND OF THE INVENTION

1. Field of the Invention

The invention relates to a metering device for fuel upstream of an oxidation catalyst in the exhaust gas system of an internal combustion engine.

2. Description of the Prior Art

In modern internal combustion engines, steps are taken that are useful for the regeneration of the exhaust system of the internal combustion engine and for its thermal management. Injection valves for the metered introduction of fuel are used, for example, to regenerate a diesel particulate filter. This does not require provision of a costly coating of the diesel particulate filter or an additive tank for an additive. The device for metering diesel fuel upstream of the oxidation catalytic converter is integrated into the low-pressure fuel circuit. It injects a precisely metered quantity of fuel into the exhaust system upstream of the oxidation catalytic converter without compressed air assistance. This sharply increases the temperature of the exhaust gas in the exhaust system as it flows through the oxidation catalytic converter. This triggers the combustion of particulate matter stored in a particulate filter. The flow rate is varied in accordance with current requirements. The rugged, completely maintenance-free system controls the supply of fuel as needed, independently of the injection system of the engine.

ADVANTAGES AND SUMMARY OF THE INVENTION

According to the invention, a metering device for fuel upstream of an oxidation catalytic converter is created for an exhaust system of internal combustion engines; downstream of a supply device for fuel, a closing valve and/or a metering valve as well as an injection valve are integrated into a fuel line of a metering unit and in the region of the metering unit and/or the metering valve, at least one device for damping pressure fluctuations is provided. This device can be a damping element, an expansion component, a container, or an additional volume embodied in any way. With the aid of the device for damping, it is possible to minimize pressure peaks or pressure signals occurring in the metering device and in the exhaust system so that no damage to the individual units occurs. This also means that pressure peaks are sharply reduced and that they act on individual sensors and can therefore be recorded. In addition, the arrangement proposed according to the invention can be used to adapt or reduce an average pressure level of the metering unit. Furthermore, by connecting an inlet throttle upstream of the metering unit, it is possible to suitably damp the pressure curve in order to fulfill specification-stipulated boundary conditions of both the metering unit and the injection valve for introducing the fuel into the exhaust system upstream of the diesel particulate filter.

It is advantageous that downstream of the metering device or a low-pressure device for fuel, in particular for diesel fuel, the device for damping pressure fluctuations is associated with the metering unit and is integrated into the conduit system of the metering unit in order to reduce the pressure level.

It is also advantageous that the exhaust system or more precisely, the metering unit, is connected via at least one return line, which is equipped with an overflow valve, to a collecting tank in the motor vehicle and the metering unit and/or the closing valve with the device for damping pressure fluctuations is provided at the upstream end, after the connection point of the return line to the fuel line. Fuel is stored in the collecting tank. Depending on the embodiment, it is also possible to eliminate the first throttle and to work with only the closing valve.

In a preferred embodiment of the invention, the device for damping pressure fluctuations is then composed of at least the first and/or a second throttle and/or a chamber associated with the metering unit or an expansion in the conduit system of the metering unit.

It is also advantageous that the first throttle is provided at the upstream end, after the connection point of the return line to the fuel line and upstream of the closing valve and the second throttle in the fuel line, between the closing valve and the metering valve.

It is also advantageous that the container or the expansion component for accommodating an additional volume of fuel is integrated into the fuel line between the closing valve and the metering valve and is part of a valve block or part of the fuel line.

It is also advantageous that at least one pressure sensor is provided in the fuel line downstream of the closing valve and upstream of the metering valve and is operatively connected to the expansion component for accommodating an additional volume of fuel.

It is also advantageous that at least the second throttle equipped with a pressure sensor is connected to the fuel line between the closing valve and the metering valve and is operatively connected to the expansion component for accommodating an additional volume of fuel.

It is also advantageous that a second return line equipped with an overflow valve is connected to the fuel line between the closing valve and the metering valve or the expansion component for accommodating an additional volume of fuel.

BRIEF DESCRIPTION OF THE DRAWINGS

The invention will be described in greater detail below in conjunction with the drawings, in which.

DESCRIPTION OF THE PREFERRED EMBODIMENTS

Figure 1:
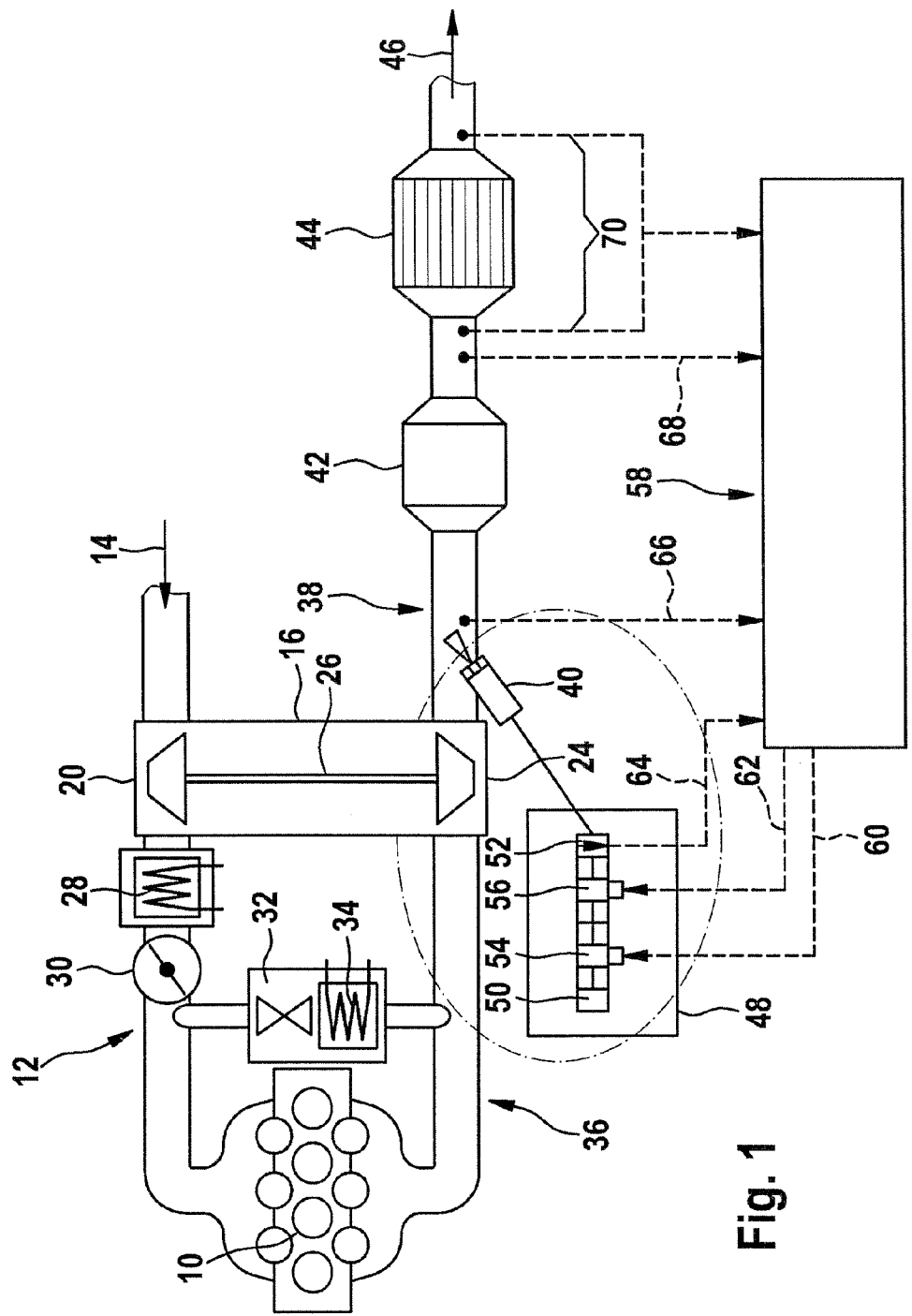
FIG. 1 is a block circuit diagram of an example of an exhaust system equipped with various electromagnetically or electronically controlled valves, a metering unit, an oxidation catalytic converter, and a particulate filter.

FIG. 1 shows a currently used system for exhaust-gas treatment, particularly in autoignition internal combustion engines.

FIG. 1 gives a very schematic depiction of an exhaust-gas treatment system in which fuel, in particular diesel fuel, is metered into an exhaust system of an internal combustion engine 10.

As shown in the schematic depiction in FIG. 1, an internal combustion engine 10, which in this case is a four-cylinder internal combustion engine, in particular an autoignition internal combustion engine, includes an intake section 12 and an exhaust section 36. The internal combustion engine 10 has a charging device 16, which, in the depiction in FIG. 1, is implemented in the form of an exhaust-gas turbocharger. The intake section 12 of the internal combustion engine 10 takes in intake air 14, which is compressed in the compressor part 20 of the charging device 16 particularly embodied in the form of an exhaust-gas turbocharger. The air, which is heated during the compression, is then cooled in an intercooler 28 accommodated in the intake section 12. The speed of the internal combustion engine 10 is influenced by means of a throttle device 30 connected downstream of the intercooler 28. Situated downstream of the throttle device 30, which is provided in the intake section 12 of the internal combustion engine 10, is the junction of an exhaust-gas recirculation line 32, which is equipped with an exhaust-gas recirculation valve and a cooler 34 for cooling the very hot exhaust gas, which components are in turn supplied with the compressed fresh air that has been cooled in the intercooler 28.

Furthermore, the internal combustion engine 10 is provided with an exhaust section 36 situated downstream of it. An exhaust manifold on the exhaust side conveys the exhaust gas into an exhaust line 38 that accommodates a turbine part 24 of the charging device 16 of the internal combustion engine 10, which charging device is particularly embodied in the form of an exhaust-gas turbocharger. The turbine part 24 of the charging device 16 is used to relieve the pressure of the exhaust gas and to drive the compressor part 20 to compress the intake air 14. The compressor part 20 and the turbine part 24 are coupled to each other by means of a rigid shaft 26. In lieu of the rigid shaft 26 shown in FIG. 1, it is also possible for clutches, interconnected shaft segments, or the like to be provided.

An injection valve 40 is situated in the exhaust line 38 downstream of the turbine part 24 of the charging device 16 particularly embodied in the form of an exhaust-gas turbocharger. The injection valve 40, which is preceded by a metering unit 48, injects fuel, in particular diesel fuel, downstream of the turbine part 24 and upstream of an oxidation catalytic converter 42 accommodated in the exhaust line 38. Downstream of the injection point, i.e. downstream of the injection valve 40, is the oxidation catalytic converter 42, which is in turn followed by a diesel particulate filter 44. Exhaust gas 46, which exits the exhaust line 38, has therefore passed through the oxidation catalytic converter 42 and the diesel particulate filter 44.

The injection valve 40, which can be a structurally adapted fuel injection valve, opens at a supply pressure so that fuel, in particular diesel fuel, can be injected into the exhaust line 38 of the exhaust section 36. The metering unit 48, which is schematically represented in the depiction according to FIG. 1, includes a first pressure sensor 50 and a second pressure sensor 52. In addition, a closing valve 54 and a metering valve 56 are integrated into the metering unit 48. The metering unit 48 is in turn controlled by a control module 58. The control module 58 triggers the closing valve 54 situated in the metering unit 48 by means of a triggering signal 60 and also triggers the metering valve 56 provided in the metering unit 48 by means of a triggering signal 62. A pressure signal 64 travels to the control module 58 from the second pressure sensor 52, which is situated in the metering unit 48 upstream of the supply line to the injection valve 40.

This control module also receives temperature signals 66 and 68. The temperature signal 66 indicates the exhaust-gas temperature prevailing after the injection of fuel, in particular diesel fuel, into the exhaust line 38 of the exhaust section 36. The injection of fuel causes a sharp increase in the temperature in the exhaust line 38 before the exhaust gas passes through the oxidation catalytic converter 42. After this, a temperature signal 68 downstream of the oxidation catalytic converter 42 is likewise transmitted to the control module 58 along with the pressure loss 70 occurring in the exhaust gas as it passes through the diesel particulate filter 44 before the purified exhaust gas 46 exits the exhaust line 38 of the exhaust section 36 of the internal combustion engine 10.

The supply of fuel to the metering unit 48 can be interrupted by the triggering of the closing valve 54. The closing valve 54 is actuated whenever no regeneration of the diesel particulate filter 44, i.e. no combustion of the particulate matter lodged therein, is to occur by means of an increase in the exhaust-gas temperature. This is generally the case during normal operation. The first pressure sensor 50 situated upstream is used to calculate the required fuel quantity to be introduced in a metered fashion. This fuel quantity is made available via the metering valve 56 contained in the metering unit 48 and supplied to the injection valve 40.

Figure 2:
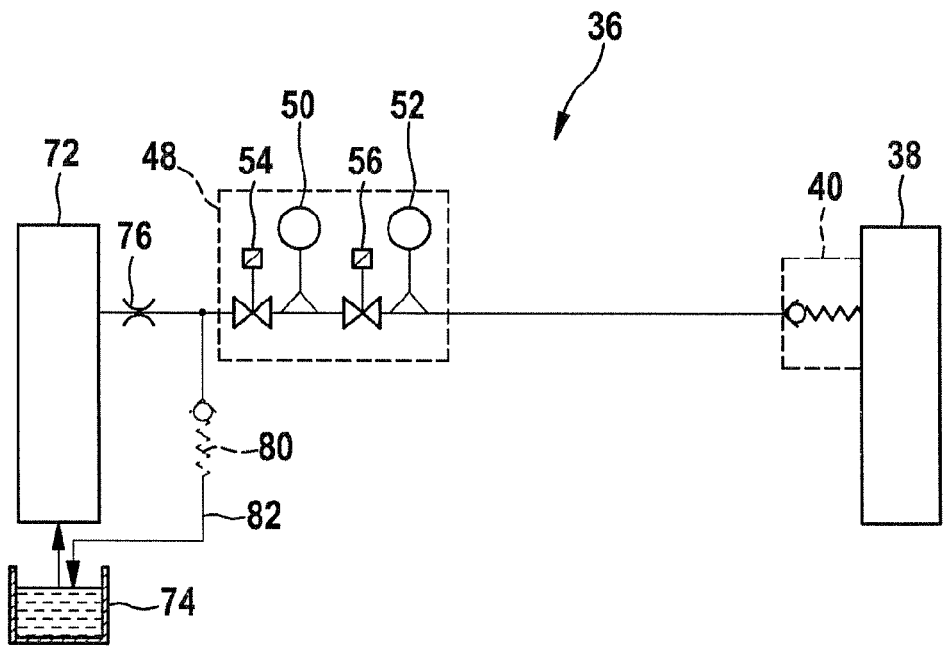
FIG. 2 is a block circuit diagram similar to the first exemplary embodiment, in which a return line equipped with an overflow valve is connected to the fuel line between an inlet throttle and the metering unit and is connected to the collecting tank.

The depiction in FIG. 2 shows that fuel from a low-pressure circuit 72 is supplied via a throttle restriction 76 to the metering unit 48. The low-pressure circuit 72 is connected to a collecting tank 74 via a line that is only schematically depicted in the depiction according to FIG. 2. Through the throttle restriction 76, which is also referred to as the inlet throttle, the fuel flows to the metering unit 48, which is indicated by the rectangular frame depicted with dashed lines in the depiction according to FIG. 2. The housing in which the metering unit 48 is accommodated is not shown in detail in FIG. 2.

In regeneration pauses, i.e. when the diesel particulate filter 44 is not to be regenerated, i.e. no combustion of particulate matter lodged in it is being carried out, the closing valve 54 situated downstream of the throttle restriction 76 shuts off the supply of fuel to the metering unit 48. In this case, the fuel flows back to the collecting tank 74 via a return 82 and via an overflow valve 80 embodied, for example, in the form of a check valve. In addition, the metering unit 48 according to the depiction in FIG. 2 includes a first pressure sensor 50 that is used to calculate the required metering quantity to be introduced in a metered fashion. This metering quantity is made available via the metering valve 56 and conveyed from it to the injection valve 40. Preferably, this valve is a spring-loaded injection valve that opens when a predetermined opening pressure is exceeded so that fuel can be injected into the exhaust line 38.

The metering unit 48 also includes an additional pressure sensor 52 situated downstream of the metering valve 56. This second pressure sensor 52 situated downstream is used to detect a leakage in the line extending to the injection valve 40 and measures the pressure of the fuel at the outlet from the metering unit 48.

Figure 3:
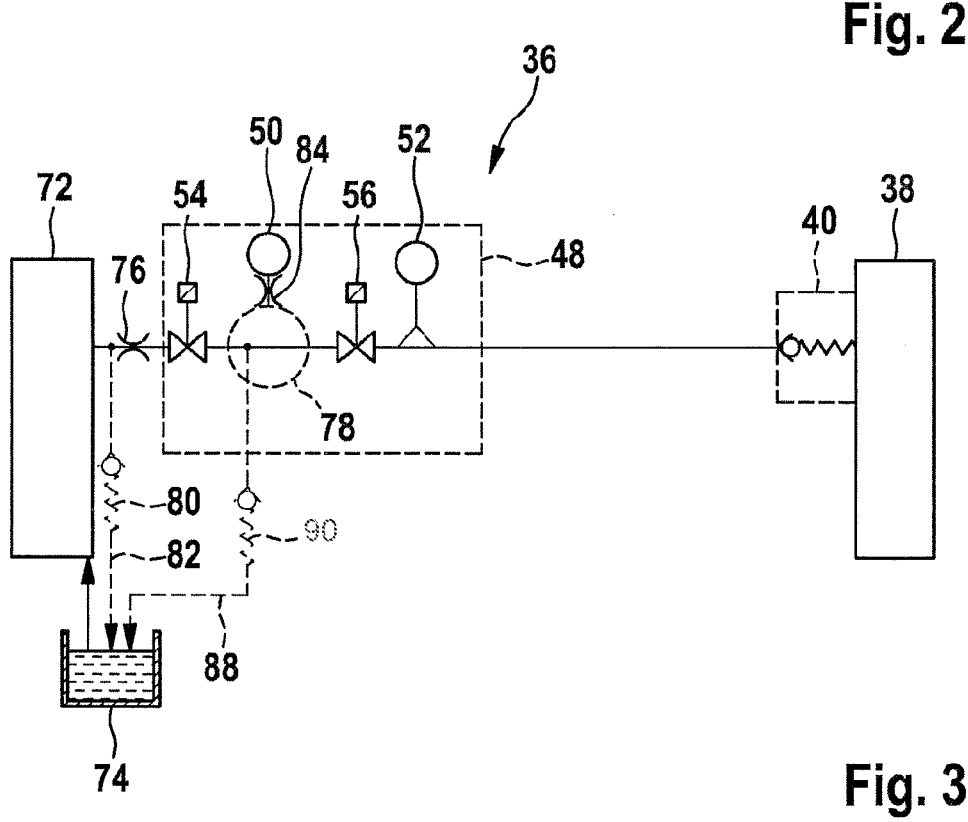
FIG. 3 is a block circuit diagram of another exemplary embodiment into which an additional damping component in the form of a chamber can be integrated into the metering unit.

FIG. 3 shows the metering unit 48 proposed according to the invention. In a fashion analogous to the depiction in FIG. 2, the metering unit 48 according to the depiction in FIG. 3 is supplied with fuel from a low-pressure circuit 72. The fuel is supplied to low-pressure circuit 72 from a collecting tank 74. When the closing valve 54 is closed, i.e. during regeneration pauses of the diesel particulate filter 44, the return 82 to the collecting tank 74 branches off upstream of the throttle restriction 76, also referred to as an inlet throttle; in this case, no fuel from the low-pressure circuit 72 travels to the metering unit 48 via the throttle restriction 76. The depiction according to FIG. 3 shows that the metering unit 48 has a connection between the closing valve 54 and the metering valve 56. A second overflow valve 90 and a parallel return 88 to the collecting tank 74 are connected to this connection. The parallel return 88 is connected between the closing valve 54 and the metering valve 56 and/or a pressure damper 78 for accommodating an additional volume of fuel and is connected to the collecting tank 74. By means of this embodiment, it is possible to adjust and maintain the average pressure level that prevails in the metering unit 48, i.e. an operating pressure level in the metering unit 48. It is also possible to influence the pressure curve through appropriate dimensioning of the throttle restriction 76.

As is clear from the depiction according to FIG. 3, the pressure damper 78, which can be embodied in the form of an expansion of the flow cross-section, a damping volume, or the like, is situated between the closing valve 54 and the metering valve 56. As is also clear from the depiction according to FIG. 3, the metering unit 48 is designed so that the connection of the second parallel return 88 to the collecting tank 74 is situated between the closing valve 54 and the metering valve 56. The first pressure sensor 50 is associated with the pressure damper 78 via a damper throttle 84. The second pressure sensor 52 is connected downstream of the metering valve 56 at the outlet of the metering unit 48. The second pressure sensor 52 detects a leakage in the line that leads to the injection valve 40. By means of the injection valve 40, which in the simplest case can be embodied in the form of a check valve, fuel is introduced into the exhaust line 38 and into the exhaust gas flowing through it. The injection valve 40, which in the simplest case is embodied in the form of a check valve, opens as soon as a particular opening pressure is reached in the supply line, i.e. downstream of the metering unit 48. This opening pressure is continuously measured by means of the second pressure sensor 52, which is contained in the metering unit 48.

The second overflow valve 90, which is contained in the parallel return 88 to the collecting tank 74, can be an external component, which is provided in the form of a separate component in the parallel return 88 or on the housing, not shown, of the metering unit 48. The second overflow valve 90 can also be integrated into the metering unit 48. Depending on the intended use and vehicle applications, it is possible to adapt the opening pressure and to influence the flow rate of fuel through the second overflow valve 90 to the collecting tank 74.

In addition, a pressure damper 78 that is as large as possible is provided inside the metering unit 48. An additional damper throttle 84 can be provided between this pressure damper and the first pressure sensor 50. Through the appropriate matching of the throttle cross-section of the damper throttle 84 in connection with the definite opening time of the second overflow valve 90 that is contained in the parallel return 88, it is possible to set a desired operating pressure range in the metering unit 48 and also to maintain this pressure during operation.

Damping measures can also be carried out as needed outside the metering unit 48. For example, the pressure level can be reduced so that it is possible to take into account any specifications of the closing valve 54. Pressure fluctuations that occur in the low-pressure circuit 72 can optionally be reduced upstream of the metering unit 48 by providing a damping volume in the vicinity of the throttle restriction 76 upstream of the metering unit 48. For this purpose, it is possible to insert an elastic tube or the like, for example, which extends between the low-pressure circuit 72 and the metering unit 48.

The connection of the first pressure sensor 50 downstream of the closing valve 54 is carried out, for example, by means of a bore provided in the valve housing. Through the direct connection of the first pressure sensor 50, it is possible to compensate for pressure fluctuations and cavitation events that occur downstream of the closing valve 54 and therefore cause supply pressure fluctuations. In order to avoid or minimize pressure peaks upstream of the first pressure sensor 50, the following steps can be taken: simple connection of the first pressure sensor 50 to the damper throttle 84 as shown in FIG. 3. It is also possible to achieve a damping of pressure fluctuations by providing a spaciously designed fuel volume, i.e. of the pressure damper 78, with the aid of the above-mentioned compensation chamber or expansion part.

The metering of the fuel quantity finally required for injection into the exhaust line 38 occurs with the aid of the metering valve 56, downstream of which the second sensor 52 is provided for measuring the pressure level.

In the regeneration pauses, the closing valve 54 interrupts the flow of fuel to the metering valve 56. In this case, the fuel flows via the first overflow valve 80, which is connected upstream of the throttle restriction 76, and via the return 82, back into the collecting tank 74. If the closing valve 54 is opened, once the fuel passes through the pressure damper 78, it can reach the metering valve 56. The first pressure sensor 50 is situated in a connecting bore between the closing valve 54 and the metering valve 56 in order to optimally adjust or calculate the fuel quantity to be metered into the flow of exhaust gas. This first pressure sensor is used for calculating the required in metering quantity. This metering quantity is made available by means of the metering valve 56 and conveyed to the injection valve 40. The injection valve 40—as mentioned above—can be a passively opening valve such as a check valve that opens when a particular opening pressure is reached and injects fuel, in particular diesel fuel, into the exhaust line 38 of the exhaust section 36.

When the exhaust-gas treatment system proposed according to the invention is used, the injection valve 40 is for example screwed into a cooling component, not shown in the depiction according to FIG. 3, that is fed directly, for example, by means of the cooling water circuit of the internal combustion engine 10. The cooling of the injection valve 40 can also be enabled with the aid of a fuel flow, not shown in the drawing, that is conveyed past the injection valve 40.

The principal connection of the second pressure sensor 52 is identical in the embodiments according to the depictions in FIGS. 2 and 3.

According to the depiction in FIG. 3, an additional volume 78 that functions as a pressure damper is provided downstream of the closing valve 54 and downstream of the first pressure sensor 50 in the metering unit 48. For example, this additional volume can be provided in the form of a cross-sectional enlargement in the line of the metering unit 48, e.g. by means of an enlarged section of the bore. The provision of this additional volume $78 > 2$ cm$^3$ or between 2 cm$^3$ and 20 cm$^3$, in particular between 2 cm$^3$ and 10 cm$^3$, functions as a damping volume inside the metering unit 48.

As mentioned above, according to the depiction in FIG. 3, the metering unit 48 is connected to the low-pressure circuit 72. The metering line exits the metering unit 48 downstream of the second pressure sensor 52 and extends to the injection valve 40. It can be inexpensively cooled with the aid of fuel flowing past the since the exhaust-gas temperature climbs to approximately 600° C. as it flows through the oxidation catalytic converter. Furthermore, with the aid of a cooling device, not shown in the depiction according to FIG. 3, it is also possible to avoid a rapid deterioration of the fuel. Just upstream of the outlet opening of the injection valve 40, the metering line can have a fuel return connected to it, which is in turn connected to the collecting tank 74 by means of a pressure valve that can be controlled or regulated.

The foregoing relates to the preferred exemplary embodiments of the invention, it being understood that other variants and embodiments thereof are possible within the spirit and scope of the invention, the latter being defined by the appended claims.

The invention claimed is:

1. A metering device for fuel, located upstream of an oxidation catalytic converter in an exhaust section of an internal combustion engine of a motor vehicle and downstream of a supply device for fuel, the metering device comprising:
a closing valve and an injection valve integrated into a line of a metering unit from which a first return equipped with a first overflow valve branches, characterized in that downstream of the closing valve, a parallel second return is provided, which is equipped with a second overflow valve that influences an average pressure level of the metering unit
wherein a metering valve is situated downstream of the closing valve, and
wherein the second return is situated between the closing valve and the metering valve.

2. The metering device as recited in claim 1, wherein downstream of the supply device for fuel, a throttle restriction is connected upstream of the metering unit.

3. The metering device as recited in claim 1, wherein the parallel second return equipped with the second overflow valve extends between the closing valve and the metering valve or a pressure damper.

4. The metering device as recited in claim 1, wherein a device for damping pressure fluctuations is integrated into a conduit system of the metering unit.

5. The metering device as recited in claim 4, wherein the device for damping pressure fluctuations is integrated into the metering unit between the closing valve and the metering valve.

6. The metering device as recited in claim 4, wherein the device for damping pressure fluctuations includes at least one damper throttle and/or a chamber associated with the metering unit or an expansion in the conduit system of the metering unit.

7. The metering device as recited in claim 6, wherein the device for damping pressure fluctuations, embodied as a container or as an expansion part for accommodating an additional volume of fuel, is part of a valve block or part of the conduit system of the metering unit.

8. The metering device as recited in claim 4, wherein in the metering unit, downstream of the closing valve and upstream of the metering valve, at least one first pressure sensor is provided, which is operatively connected to the device for damping pressure fluctuations.

9. The metering device as recited in claim 8, wherein between the closing valve and the metering valve, at least one damper throttle is connected to the first pressure sensor and is operatively connected to the device for damping pressure fluctuations.

10. The metering device as recited in claim 4, wherein the metering unit is connected via the first return, which is equipped with the first overflow valve, to a collecting tank in the motor vehicle and downstream, after a connection point of the first return, the metering unit and/or the closing valve is provided with the device for damping pressure fluctuations.

11. The metering device as recited in claim 10, wherein the device for damping pressure fluctuations includes at least one damper throttle and/or a chamber associated with the metering unit or an expansion in the conduit system of the metering unit.

12. The metering device as recited in claim 11, wherein an inlet throttle is provided downstream, after the connection point of the first return, upstream of the closing valve and the damper throttle in the metering unit.

* * * * *

UNITED STATES PATENT AND TRADEMARK OFFICE
CERTIFICATE OF CORRECTION

PATENT NO.       : 8,528,324 B2                                                                 Page 1 of 1
APPLICATION NO. : 13/054320
DATED            : September 10, 2013
INVENTOR(S)      : Keusen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Fifteenth Day of September, 2015

Michelle K. Lee
*Director of the United States Patent and Trademark Office*